(12) United States Patent
Baize

(10) Patent No.: US 6,317,838 B1
(45) Date of Patent: Nov. 13, 2001

(54) METHOD AND ARCHITECTURE TO PROVIDE A SECURED REMOTE ACCESS TO PRIVATE RESOURCES

(75) Inventor: Eric Baize, Sudbury, MA (US)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/067,961

(22) Filed: Apr. 29, 1998

(51) Int. Cl.[7] ........................................ G06F 12/14
(52) U.S. Cl. ................ 713/201; 713/152; 713/153; 713/154; 713/155; 713/165; 713/166; 713/176; 713/184; 713/203; 380/244; 380/44
(58) Field of Search ....................... 713/152, 153, 713/154, 155, 165, 166, 176, 184, 201, 202; 380/244, 44

(56) References Cited

U.S. PATENT DOCUMENTS

| | | | |
|---|---|---|---|
| 5,491,752 | * 2/1996 | Kaufman et al. | 380/30 |
| 5,657,388 | * 8/1997 | Weiss | 380/23 |
| 5,721,908 | * 2/1998 | Legarde et al. | 395/610 |
| 5,768,503 | * 6/1998 | Olkin | 395/187.01 |
| 5,818,936 | * 10/1998 | Mashayekhi | 380/25 |
| 5,918,019 | * 6/1999 | Valencia | 395/200.57 |
| 5,935,251 | * 8/1999 | Moore | 713/202 |
| 5,944,824 | * 8/1999 | He | 713/201 |
| 6,038,597 | * 3/2000 | Van Wyngarden | 709/219 |
| 6,052,785 | * 4/2000 | Lin et al. | 713/201 |

OTHER PUBLICATIONS

Security in Computing, Second Edition (Pfleeger, Charles P., 1996, pp. 428–434).*

* cited by examiner

Primary Examiner—Albert DeCady
Assistant Examiner—Paul E. Callahan
(74) Attorney, Agent, or Firm—Miles & Stockbridge PC; Edward J. Kondracki

(57) ABSTRACT

A method and architecture allowing a remote user, especially an Internet remote user, to securely access private resources protected by a firewall. The architecture comprises a computer facility and many remote user terminals connected via the Internet. The computer facility comprises a security server that controls a security database. The firewall comprises a centralized security means, which is under the control of a security server and is arranged to authenticate remote users and to provide a security profile describing all resources a user may access with a single sign-on data during a single session. A user's terminal further includes a device to generate one-time passwords and the computer includes a device to decode the passwords. The accessed resources may be servers or logical units acceded though protocols having a notion of authentication.

14 Claims, 3 Drawing Sheets

METHOD AND ARCHITECTURE TO PROVIDE A SECURED REMOTE ACCESS TO PRIVATE RESOURCES

BACKGROUND OF THE INVENTION

1. Field of the Invention

The invention concerns a method to provide a secured remote access to private resources.

More specifically, the method allows remote Internet users to access securely to private resources protected by a firewall.

The invention also concerns an architecture implementing said method.

Within the framework of the invention, "resources" are related to all kinds of "objects": hardware or logical units, such as a particular computer, microcomputer or server in a data processing system, a disk unit, a database, or a software application, etc.

2. Description of the Prior Art

When a user or a client device attempts to access to a particular protected resource located in a data processing system, generally it is necessary to check whether it may or not access to said resource. For example, if the user sends a request so as to read some protected data, its requests must be filtered, before granting such an access. On the one hand, the authentication of the user must be performed. On the second hand, after this authentication stage is performed, the request is allowed or discarded according to his rights or privileges.

If the problem is to be handled on a local area or on a LAN (Local Area Network), the solution is generally quiet simple. The number of users and their rights and other identification data are well known and mastered. The information is usually stored in a secured data base. These data and associated security mechanisms are under control of a security officer or a system administrator.

When a session is started at a user's station or the like, the usual process is the following :

The user enters some identification data, for example a log-in and a password, which are sent to a server.

Upon reception, the server or a security device filters the request, i.e. it compares the received data with filtering rules stored in a secured data base. If the user is authorized to access the resource, the operation is allowed. Otherwise, the operation is denied. The control may be more sophisticated: for example a given user may read data stored on a particular disk unit, but not write data nor erase them.

Another problem relates to a multiple access request, i.e. when a user's device requests to access successively to more than one resource, for example to three separate servers. The usual way to proceed is to enter as many different passwords (and eventually log-in words) as there are servers to be accessed, or more generally speaking number of resources to be accessed. Thus, the user has to remember a lot of authentication data.

Furthermore, the system has to cope with the necessity to change, at least at regular intervals, the set of passwords, identification data and authorization levels attributed to users and resources. Such modifications are also made when at least one of the following circumstances arises: addition, modification or deletion of one or more resources.

To overcome the above-recalled problems, as far as local access requests are concerned, some methods have been proposed in the prior art.

One method is based on the implementation of a special piece of security software in the user's station. When a user wants to access one or more servers or resources, he enters a log-in and a password, or any other authentication data sets, as usual. However, this stage is performed once for a whole session. Said piece of security software sends a request to a security manager unit or the like which looks at a secured data base. Said request consists in a message transmitted through any suitable channel that does not need to be secured per se. However, the data themselves are usually coded or more exactly enciphered. According to the result of the comparison between received data and stored data, the security unit makes a decision whether or not the user is permitted to use one or more resources. It send back an enciphered response message to the requesting user's station. Said message contains data indicating whether the connection to one or more resources is allowed or denied, and eventually which resources are allowed if all are not permitted, taking into account the entered password. The corresponding data is stored in the user's station under control of the special piece of security software.

Such a feature is often called "SSO" ("Single Sign-On").

It is easy to understand that to manage the access of remote users, according to a given security policy, in a consistent way, is more difficult than locally.

As above-recalled, thought the invention is not limited to this sole application, the preferred application concerns remote accesses to private resources through Internet.

Such a network exhibits specific features. Some are recalled here-after.

The number of users connected to Internet is not limited. Solutions, such as the ones recalled, which are convenient for a LAN or the like are useless. As a matter of fact, it is not realistic or even possible that the security officer or the security manager unit can control hundred or thousand users, distributed on a worldwide basis, in particular when security data associated with various resources are to be changed very often. In other words, it is not possible to simply implement the above-recalled piece of security software in each user's workstation, remote personal computer or terminal to solve the above-recalled problem.

Transmissions use standardized protocols such as "FTP" ("File Transfer Protocol"), "Telnet" (terminal emulation), "HTTP" ("Hyper Text Transfer Protocol") , etc. So, any solution implemented so as to secure data exchanges must cope with standardization requirements.

Internet constitutes a highly insecure network. Messages routing is never foreseeable. In particular, it depends on an eventual congestion along backbones or any transmission channels. Messages may be stored in "ISP" stations ("Internet Service Providers") before to being delivered or downloaded, and can be copied. Thus security can not be guaranteed.

Usually, a security device, called a "firewall", is provided in order to isolate the "outside world", i.e. Internet, from the "inside world", LAN or other computer facilities. But prior art devices only filter "IP" ("Internet Protocol") addresses, i.e. one of the lowest layers of the architecture. Internet layers comprise the following ones "Physical", "Data Link" ("PPP", "Slip", etc.), "Network" ("IP"), "Transport" ("TCP", "UDP") and "Application" ("HTTP", "FTP", "e-mail", etc.).

The problem of securely filtering remote access requests to a protected server (i.e. a physical machine), an application, for example a "FTP" type application (i.e. a higher level layer), or any other resource remains unsolved.

In the prior art some attempts have been made to solve this problem.

The first solution is known as a "VPN" ("Virtual Private Network"). It consists in providing secured "data pipes" constituting so-called "Extranets" which are extensions of Intranets or LANs. As communication channels are not located inside a well delimited area (private building, manufacturing plant, etc.), it is necessary to use a cryptology method in order to secure transmitted data. Furthermore, as they are publicly transmitted and thus can be intercepted, enciphered data must be very difficult to be decrypted. It implies that high-level algorithms must be used, for example algorithms exhibiting a long-sized encoding key. However, such algorithms are not allowed in some country, for example in France (except if a special authorization is given: defense-related applications, etc.), at least when they the purpose is to encipher the whole message. They are only allowed for encoding authentication data, such as electronic signatures (sealing function). On networks of the "VPN" type, it is impossible to differentiate authentification data from application data. Thus, a "VPN" type solution commonly uses low-level algorithms or weak keys, which is not sufficient to protect very sensitive data, as passwords for example. Furthermore, problems in connection with the necessity to remember a lot of passwords and other authentication data remain unsolved.

An other known solution consists in securing the initial authentication stage with "One-Time Passwords" ("OTP"). Stealing such passwords is without importance as they can not be "re-played". However, as above, the problem relating to the necessity to remember a lot of authentication data remains unsolved. At the beginning of a session, a final user must retrieve the connection data for each server or resource to be accessed. Furthermore, the solution is very expensive to implement as each protected accessed resource must be modified in order to install an authentication client which is able to handle one-time passwords.

Other solutions are based on standards authentication protocols as "TACACS" ® or "RADIUS" ® which permit to route authentication requests outside filter network hardware. These solutions allow the implementation of one-time passwords generation means, as above recalled. However, problems in connection to the necessity of remembering a lot of passwords and other authentication data remain again unsolved.

The invention is directed to alleviate the drawbacks of the prior art methods, some of which have just been referred to, and to meeting the stated requirements.

SUMMARY OF THE INVENTION

The main objectives of the invention are thus to allow remote users, especially Internet users, to access "friendly" and securely to given private resources protected by a firewall or the like.

To achieve these goals, means to filter remote requests are integrated in said firewall or the like. Managing of remote accesses to private resources is made from a single point. It obeys to the security policy of the domain, or more generally of the computer facility, in a consistent way. Said means are in close relation with a secured data base and control means there-of.

The users benefit of the so-called "Single Sign-On" feature. The user opens a session using one log-in and one password, or some other authentification data, and continues with the same data. Requests to access given successive private resources are under control of said centralized filtering means. From the user's side, the firewall remains transparent during a session.

It may be emphasized that the method according to the invention is only involved with protocols having a notion of authentication. For example, in the preferred application, i.e. related to Internet remote users, such protocols are "FTP", "Telnet", etc., but other protocols as "SMTP" ("email"), "NNTP" ("News"), etc. are not concerned.

In a preferred embodiment of the method according to the invention, authentification is performed with "One-Time Passwords". Thus, passwords can not be re-played. This further feature is provided in combination with the implementation of centralized filtering means. It does increase dramatically the complexity and/or the cost. An authentication client which is able to handle one-time passwords must be implemented as in prior art methods. However, said client is installed once and only once in the firewall, not at the level of the different resources to secure.

The object of the invention is thus to provide a method allowing a remote user to gain a secured access to private resources of a digital data processing system protected by a firewall or the like, said method comprising at least the following steps:

an initial step comprising the stages of:
  a/ implementing in said digital data processing system security storing means for storing security data, said security data comprising at least data to authenticate said user, security profiles indicating which private resources each user may use and security data associated with said private resources;
  b/ implementing in said firewall centralized security means able to filter remote access requests to said private resources according to rules derived from said security data; and operational subsequent steps comprising at least the following stages:
  a/ at the user's side, a first stage comprising the opening of a session, a second stage comprising the entering of security data, including at least user's authentication data, and a third stage of requesting an access to a first private resource; and
  b/ at the digital data processing system's side, a first stage, under control of said centralized security means, comprising a comparison between received security data from said remote user and said authentication data stored in said security means, in order to authenticate said remote user; if said authentication succeeds, a second stage providing said centralized security means with a security profile associated with said remote user; and a third stage providing said requested first private resource with security data allowing said remote user accessing to this first resource.

Another objet of the invention is an architecture to implement said method.

LIST OF THE DRAWINGS

The invention will be more clearly understood and other features and advantages will emerge from reading the following description, given with reference to the appended drawings wherein.

DETAILED DESCRIPTION OF THE INVENTION

Though the invention is not limited to remote accesses to private resource via Internet, the following detailed description will take place for such an application (which constitutes the preferred application), unless otherwise stated.

Figure 1:
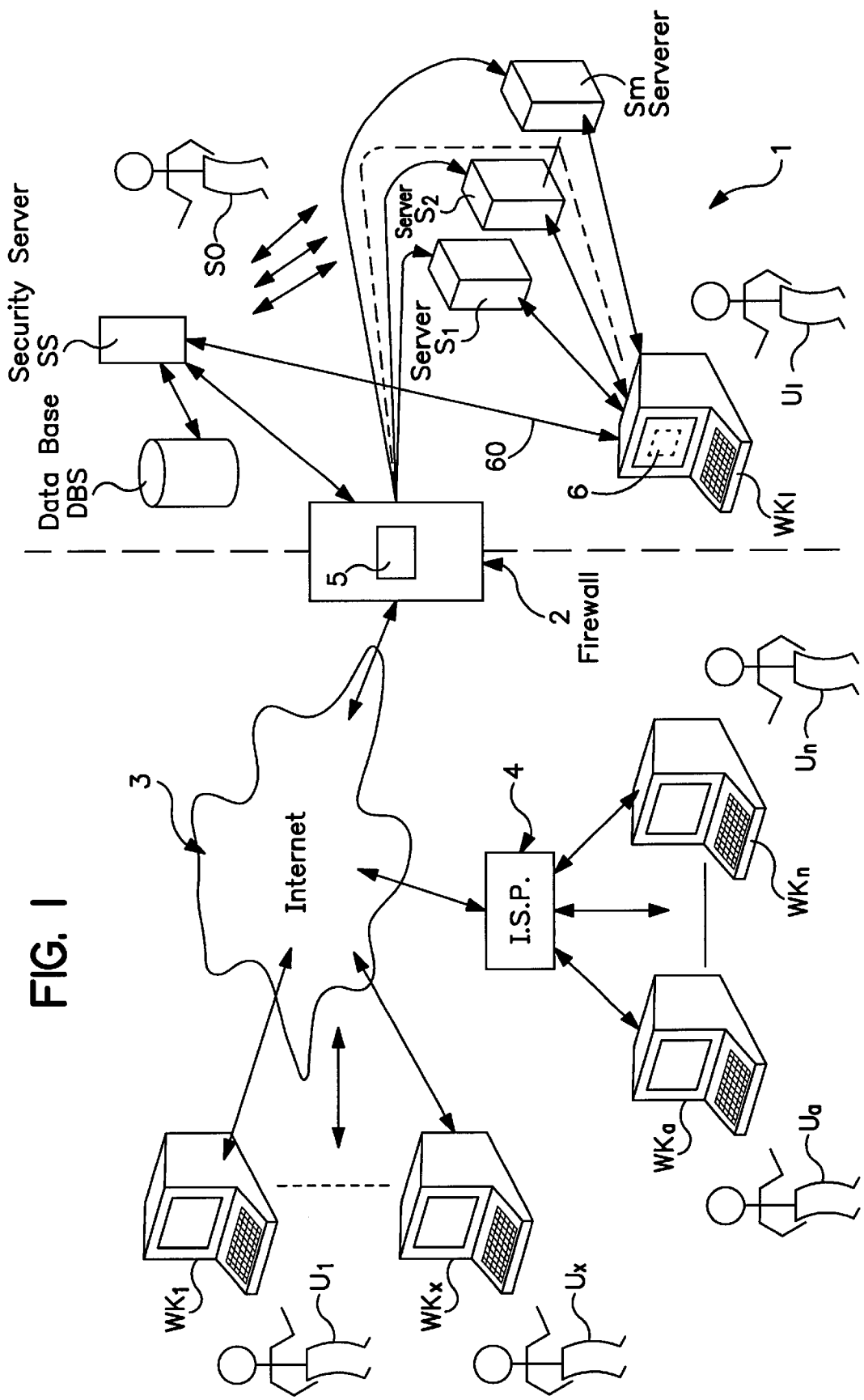
FIG. 1 illustrates an example of an architecture allowing secured remote accesses to private resources, according to the method of the invention.

FIG. 1 illustrates a typical worldwide system comprising, for the sake of simplicity, one computer facility 1 connected to Internet 3, via a firewall 2, and various user's workstations, personal computers or terminals also connected to Internet 3, directly, $WK_1$ to $WK_x$, or via a "ISP" ("Internet Service Provider") 4, $WK_a$ to $WK_n$. The computer facility 1 may be based on a LAN (not explicitly shown) and also comprises various local user's workstations. Only one is shown: workstation $WK_1$. Some private resources are connected to the LAN. In the described example, they are supposed to be servers, $S_1$ to $S_m$. But, it must be clear that private resources may be indifferently physical machines such as servers or disks, data base, files, applications, etc. The remote users are referenced $U_1$ to $U_x$ and $U_a$ to $U_n$, and the sole local shown user $U_1$.

A security server $S_S$ is also provided. It communicates with a security data base $DB_S$ which contains security and authorization profiles of both secured or private resources, i.e. $S_1$ to $S_m$, and local users, for example $U_1$. The security server $S_S$ is supposed to be under control of a security officer SO or any other authorized authority.

According to one of above-described prior art solutions, a local workstation, such as $WK_1$, may comprise a specific piece of security software 6, which will be called "workstation security interface", intended to form an interface between the security server $S_S$ and the workstation $WK_1$. When a local user, such as $U_1$, opens a session, he enters single sign-on data and a request to access one of servers $S_1$ to $S_m$, for example server $S_2$. A dialog is initiated between the security server $S_S$ and this piece of security software 6, via a bus 60. The data transmissions are enciphered. The server $S_S$ looks at the data base $DB_S$ and compares the received data (identity of user $U_1$, password, etc.) with the content of said data base $DB_S$. It authenticates the requester, i.e. user $U_1$, and send back a message to workstation $WK_1$ and more precisely to its security interface 6. This message contains information on the authorization profile associated to user $U_1$. Authorization data is then securely stored in the station under control of the security interface 6. It contains all the resources that user $U_1$ is authorized to access and, eventually, the specific operations he may realize. For example, he may only access servers $S_y$ and $S_z$, and only perform read operations, y and z being arbitrary. Information transmitted back to the interface 6 further contains log-in data and/or passwords associated to each authorized resources. If user $U_1$ does not stop the session in progress and requests an access to an other resource, for example to server $S_1$, it is not necessary to enter an other log-in and an other password. The interface 6 knows whether the requested access is possible or not. If said access is possible, the interface 6 send to the requested server or resource necessary security data. This last operation is completely transparent to user $U_1$.

Up to this point, the recalled architecture is common to the prior art, per se. But, the above-described solution is not realistic in order to cope with remote access requests as already demonstrated.

According to a first feature of the invention, centralized security means 5 is implemented in the firewall 2. Remote access requests to a given private resource are submitted to the security means 5. They are under control of security servers $S_S$. The main function is to filter said requests according to applicative filtering rules which are stored in database $DB_S$.

In fact, there are two levels of filtering.

Figure 2:
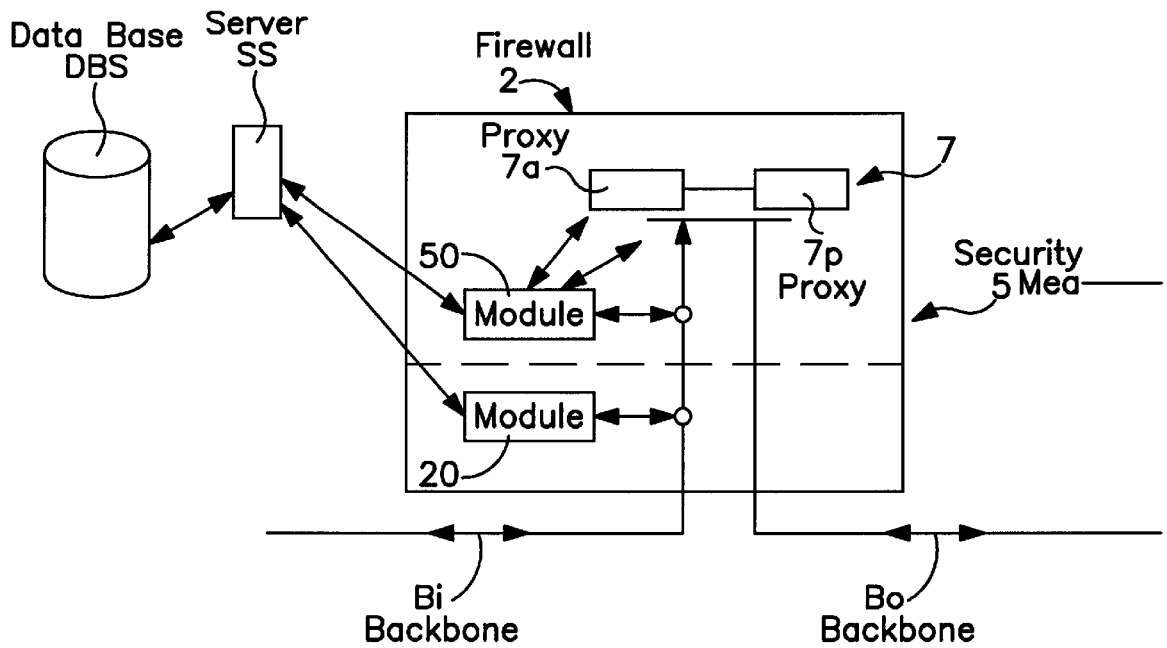
FIG. 2 illustrates an example of a firewall according to the invention.

FIG. 2 illustrates a more detailed block diagram of the firewall 2. It is connected to Internet 3 (FIG. 1) via a backbone $B_i$ (incoming bus). As in the prior art, a first set of filtering rules is applied. It consists in IP addresses filtering rules. This stage is executed under control of a first module 20 which communicates with server $S_S$. In the described example, the lower part of block diagram 2 constitutes the kernel space. If the IP filtering rules are satisfied, incoming requests are submitted to the upper part of block diagram 2, which will be called user space. It comprises means 5 and more specifically a module 50 containing applicative services rules, established in accordance with data stored in data base $DB_S$, under control of server $S_S$. At this stage, if these further rules are satisfied, an access to the requested application is allowed. Otherwise, an access put discarded.

In case of Internet remote users, access is requested for a "FTP" application, a "Telnet" application, etc. As recalled, the invention is only involved with protocols having a notion of authentication. If needed, the other protocols may be filtered at the application level by other means, but this stage is not necessary.

In a preferred embodiment, the firewall 2 comprises intermediate circuits called "proxies", $7_a$ to $7_p$. A proxy acts as a relay between the user's client application (for example "FTP") and the server application (also "FTP"). A typical proxy accepts a connection, makes a decision on whether or not the user or the client IP address is permitted to use the proxy (according to the requested server or resource, time period, etc.), possibly does additional authentication, and completes a connection on behalf of the user to the remote server or resource, through bus $B_O$ (output bus). A proxy is thus "transparent" both for users and servers or resources (upward and downward connections, respectively). There are as many proxies as there are different types of applications: "FTP", "Telnet", etc. (including types not directly concerned by the invention, such as "SMTP", etc., i.e. without a notion of authentification).

To summarize the main stages of the method according to a first aspect of the invention are as follows:

a/ A remote user, for example user $U_x$ (FIG. 1), starts on workstation $WK_x$ (FIG. 1) his standard "FTP" client or an other client having a notion of authentification.

b/ Said client provides a sequence of security data, especially identity of the target server, identify proves (name, role, password), etc.

c/ Following the IP routing rules, the request arrives on firewall 2 through backbone $B_i$ and activates a proxy ($7_a$ to $7_p$) corresponding to the client started, for example "FTP".

d/ The IP filtering rules (module 20) are applied: if the request is kept, the security interface 5 and the appropriate proxy ask for an authentication with the primary authentification data of the user (name, role, password).

f/ The security server $S_S$ authenticates the user $U_x$ and if the authentication succeeds, the server $S_S$ returns to the security interface 5, an operational profile of user $U_x$, and his "SSO" ("Single Sign-On") data.

g/ If the session is maintained opened, any subsequent request to an other server or resource may be allowed or denied according to said operational profile. The security interface 5 sends requests to the server $S_S$ which looks for a "SSO" line that matches the name of the asked target server or resource, the "FTP" or "Telnet" service, or optionally the name of the wanted account, if the user $U_x$ has several accounts on said target server. Then, the target server or resource is provided with needed data. The application rules (module 50) are applied according to the operational profile of the user $U_x$.

Thus, the first feature of the invention allows remote users to access to a set of private servers or resources without need to employ several sets of authentication data, as long as the same session remains opened. Furthermore, as already noted, the firewall remains transparent to remote users and protocols.

Figure 3:
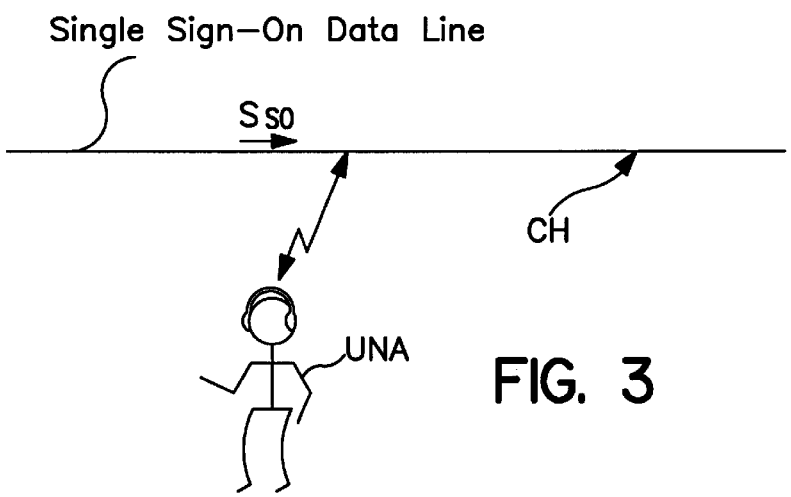
FIG. 3 illustrates schematically a password interception by an unauthorized user.

However, as transmission paths between the user's workstation, for example $WK_a$ (FIG. 1) and the firewall 2 are not secured, the "SSO" data, especially the passwords can be "listened" by a non-authorized user. FIG. 3 illustrates a non-authorized user $U_{NA}$ intercepting a "SSO" traveling on a channel CH. Same data may be copied from the "ISP" station 4 (FIG. 1) which constitutes a transmission node and where they are temporary stored.

In a preferred embodiment, according to an other aspect of the invention, authentication is performed with "OTPs" ("One-Time Passwords").

Per se, "OTP" technologies are well known. As an example it may be referred to the system called "SecureID" ®. It may be also referred to the U.S. Pat. No 5,657,388 (Kenneth P. Weiss), entitled "Method and apparatus for utilizing a token for resource access", or to the article by McLellan: "The future of Data Security looks Credit-Card Thin", in "Information Week", Oct. 7, 1985, pp. 24–30.

Acoording to said technology, a first device, resident in each remote user's station, generates "OTPs" which can not be re-played. This technology is based on Hash codes.

Figure 4A:
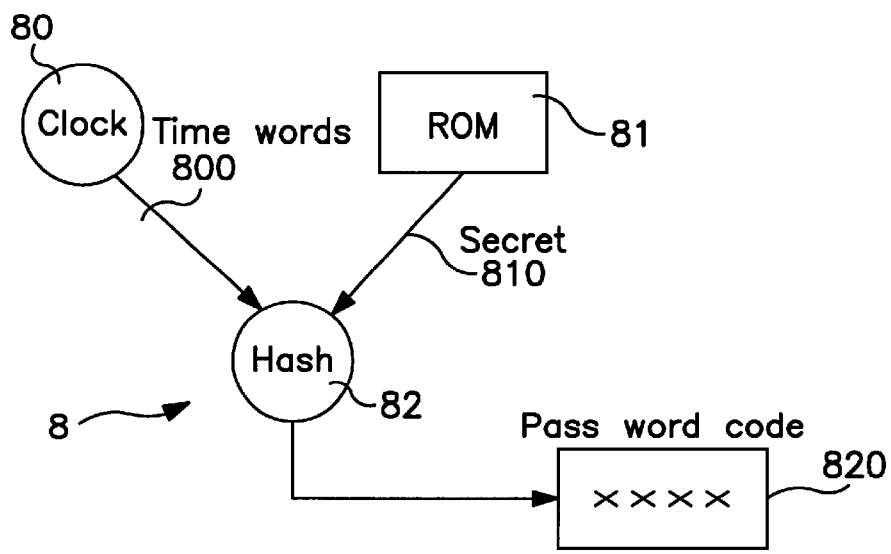
FIGS. 4a and 4b illustrate a method and a device to generate and retrieve one-time passwords.
Figure 4B:
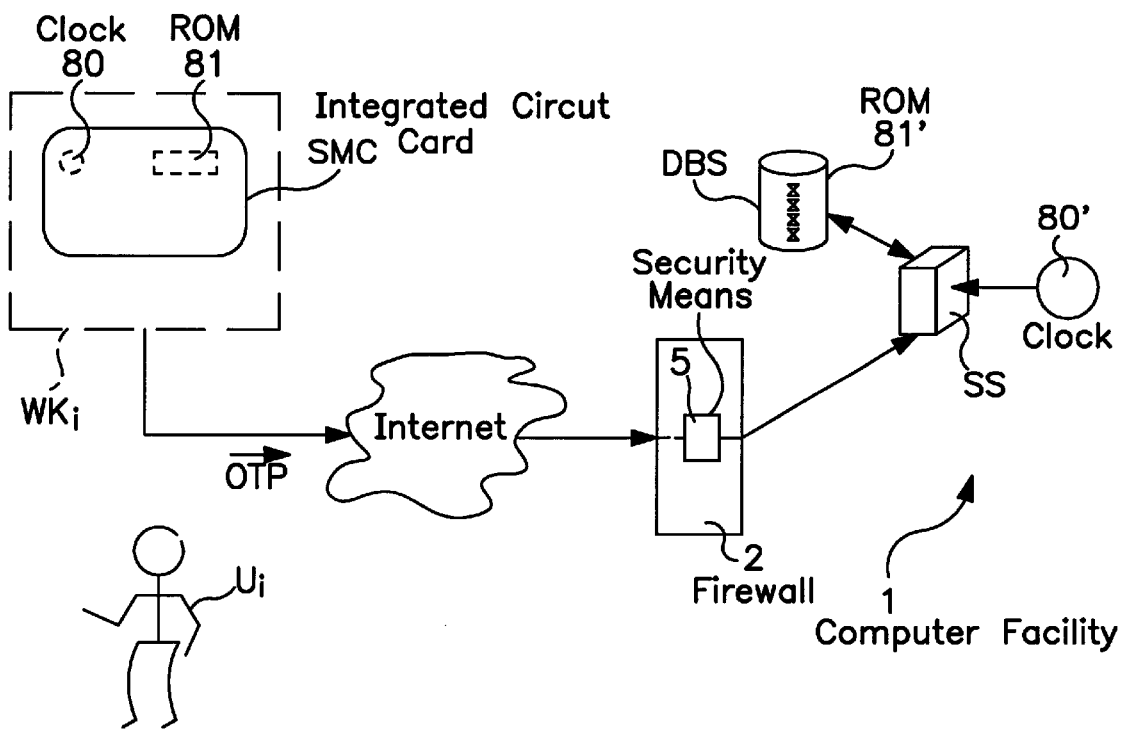

FIG. 4a and 4b illustrate an example of an "OTP" technology implemented in the architecture according to the invention.

FIG. 4a illustrates schematically a method to generate an "OTP". The generator 8 comprise a clock unit 80 which produces continuously time words 800, at least on a regular time interval basis. A Hash function 82 combines a "secret" 810 with the time word 800 in order to generate password codes 820. Said password codes 820 consist in digital words, having for example 4 to 6 digits, and which changes regularly, for example every 1 minute. The secret number 810 may be a "hardwired" word, stored in a ROM 81 implemented in an integrated circuit card $SMC_i$ for example. Said card $SMC_i$ is associated to a user's workstation $WK_i$ (FIG. 4b). The integrated circuit card $SMC_i$ acts as a small calculator and further combines password codes 820 with security data entered by the user $U_i$ (FIG. 4b), e.g. a personal identification number ("PIN") which do not change. If we call A and B the log-in and the user's password, respectively, a "OTPs" sequence, transmitted to the computer facility 1 (FIG. 4b), is A-B', A-B", etc.

In the computer facility 1, the security data base $DB_S$ stores a list of secret numbers, each associated with one the workstation $WK_i$, or more exactly with a secret number stored in one of the integrated circuit card $SMC_i$. The security server $S_S$ comprises a clock unit 80', synchronized upon the clock unit 80, or alternatively it receives synchronized time signals. These two information data allow it to retrieve initial correct security data A-B, though the password part is continuously changing (B', B", etc.). The user $U_i$ is thus authenticated and his requests are handled according to his recognized rights. On the other hand, even if an unauthorized user $U_{NA}$ (FIG. 3) intercepts one of the "OTPs" and attempts to re-play it, his request will be denied.

Though allowing an authentication performed with "OTP", the method of the invention remains quite simple to implement. Contrary to the prior art methods, the authentication module which is able to handle one-time passwords is centralized. In other words, the method does not need multiple implementations (in each resource to be securely accessed) which are very expensive and increases complexity.

A reading of the above description confirms that the invention achieves the stated objectives.

The comfort afforded to a remote user is enhanced as he has to remember only one security data set, such as a password and a log-in, for example.

The security of the authentication stage is guaranteed though the transmission network is not secured, or even is highly insecure (Internet case).

The authentication function and its managing are centralized ("one point"). Despite this centralization, the declaration of a connection name and the attribution of a password common to all remote accessible resources are avoided.

The modifications made in the final user's workstation or terminal are minimized.

The secured resources do not need to be modified, or at least not significantly modified.

The filtered protocols, which are a priori standardized, do not need to be modified.

It should be clear however that the invention is not limited to the embodiments previously described, in particular with reference to FIGS. 1 to 4b. As a matter of facts, as already stated, the invention is not limited to the authentication of Internet users, nor even remote users on a WAN (Wide Area Network). The invention also applies to the authentication and the protection of remote access requests to some private resources located in all kind of systems having a firewall or the like: filtering router, telephone access server, etc.

What is claimed is:

1. A method for allowing a user remote from a digital data processing system protected by a firewall to gain a secured access to private resources of the digital data processing system, comprising at least the following steps:
an initial implementation step comprising the stages of:
a. implementing in said digital data processing system a security storing means for storing security data, said security data including at least data to authenticate said user, security profiles indicating which private resources each user may use and security data associated with said private resources;
b. implementing in said firewall a centralized security means able to filter remote access requests to said private resources according to rules derived from said security data; and
subsequent operational steps comprising at least the following stages:
a. at the user's side of the firewall, a first stage including the opening of a session, a second stage including the entering of security data, including at least said remote user's authentication data, and a third stage of requesting an access to a first private resource; and b. at the digital data processing system's side of the firewall, a first stage, under control of said centralized security means, including a comparison between received security data from said remote user and said authentication data stored in said security means, in order to authenticate said remote user; if said authentication succeeds, a second stage providing said centralized security means with a security profile associated with said remote user; and a third stage providing said requested first private resource with security data allowing said remote user access to said first private resource.

2. A method according to claim 1, wherein said subsequent operational steps further comprise:

at the user's side, during the duration of said opened session, requesting an access to at least a second private resource, using said entered security data;

second digital data processing stage further including a conditional authorization of access to said second private resource and providing to this second private resource security data allowing said remote user access to this second resource according to said security profile.

3. A method according to claim 2, wherein said remote user is connected to said digital data processing system through the Internet.

4. A method according to claim 3, wherein said private resource is an Internet application protocol having a notion of authentication.

5. A method according to claim 1, wherein said security data entered by said remote user comprise a password and a log-in.

6. A method according to claim 5, wherein said security profiles comprise sets of security data describing all private resources that a given remote user is authorized to access, each set being associated with said security data entered by a given remote user and comprising security data to be provided in order to access a determined private resource, wherein said authentication is performed using the same user's security data during the whole duration of said opened session, and wherein security data provided to said determined private resource is derived from said security profile associated to said given remote user, upon his authentication.

7. A method according to claim 5, wherein said password is a one-time password generated from a Hash function of a combination of a secret digital word and a time-dependent digital word.

8. A network for allowing a remote user's terminal to gain secured access to private resources of a digital data processing system protected by a firewall, wherein said remote user's terminal comprises means to enter security data comprising authentication data and a request to access predetermined private resources, said digital data processing system comprising security storing means for storing security data, said security data comprising at least data to authenticate said user, security profiles indicating which private resources each user may use and security data associated with said private resources, and wherein said firewall comprises centralized security means able to authenticate said remote user upon receiving said entered security data and to filter remote access requests to said private resources, according to rules derived from said security data, to fetch a security profile from said security storing means corresponding to said authenticated remote user and to provide said first private resource with security data in accordance to said security profile, in order to allow said remote user access to said first private resource.

9. A network according to claim 8, wherein said digital data processing system further comprises a security manager for controlling said security storing means, said security manager being connected to said centralized security means.

10. A network according to claim 9, wherein said digital data processing system is in a computer facility, wherein said security manager means is a security server and wherein said security storing means is a data base.

11. A network according to claim 10, wherein said private resources are protected servers.

12. A network according to claim 11, wherein said remote user is connected to said firewall through the Internet, said private resources including protocols having a notion of authentication.

13. A network according to claim 12, wherein said firewall comprises proxy devices forming an interface between said centralized security means and said resources.

14. A network according to claim 10, wherein said user's terminal comprises a first device for generating one-time passwords, said one-time passwords being obtained from one secret digital word and first time-depending digital words, said one-time passwords being formed from at least one part of said security data entered by said remote user, and wherein said digital data processing system comprises a second device to decode said one-time passwords using secret digital words and time depending digital words, in order to authenticate said remote user and to associate one determined security profile to said user, said second device comprising means to store said second secret digital words, each associated with a given remote user, and means to generate said second time depending words in synchronization with said first digital time depending words.

* * * * *